US011997334B1

(12) United States Patent
Sethi et al.

(10) Patent No.: US 11,997,334 B1
(45) Date of Patent: May 28, 2024

(54) RUNTIME DETERMINATION OF A CONFIGURATION FILE USABLE FOR CONTENT PRESENTATION

(71) Applicant: Amazon Technologies, Inc., Seattle, WA (US)

(72) Inventors: Sahil Sethi, Seattle, WA (US); Utkarsh Dubey, Seattle, WA (US); Karan Juneja, Sammamish, WA (US); Brian Lau, Seattle, WA (US); Mingyu Fan, Seattle, WA (US); Akshay Sudhakar Dhokale, Seattle, WA (US); Rohit Kumar Saharia, Seattle, WA (US); Sathwik Pati, Bothell, WA (US); Pravi Garg, Bothell, WA (US); Bhuvan Puri, New York, NY (US); Maciej Tadeusz Golonka, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 104 days.

(21) Appl. No.: 17/547,880

(22) Filed: Dec. 10, 2021

(51) Int. Cl.
*H04N 21/81* (2011.01)
*H04N 21/262* (2011.01)

(52) U.S. Cl.
CPC ......... *H04N 21/262* (2013.01); *H04N 21/812* (2013.01)

(58) Field of Classification Search
CPC .................................................. H04N 21/812
See application file for complete search history.

(56) References Cited

U.S. PATENT DOCUMENTS

| 11,503,383 | B1 * | 11/2022 | Asarikuniyil | ........... G06F 18/24 |
| 2011/0145856 | A1 * | 6/2011 | Agarwal | ............. H04N 21/6581 |
| | | | | 725/32 |
| 2014/0115625 | A1 * | 4/2014 | McCoy | ............. H04N 21/23424 |
| | | | | 725/34 |
| 2014/0150019 | A1 * | 5/2014 | Ma | ....................... H04N 21/458 |
| | | | | 725/34 |

* cited by examiner

*Primary Examiner* — Michael H Hong
(74) *Attorney, Agent, or Firm* — Kilpatrick Townsend & Stockton LLP

(57) ABSTRACT

Techniques for dynamically determining a configuration file are described. In an example, a system receives, from a device, a request for first content to be presented by the device. The system determines metadata of the first content and a cue point indicating a start of a segment in which second content can be presented by the device. Based on the metadata and subsequent to the request, the system determines a configuration of the segment. The configuration includes: a duration of the segment, a sequence of slots in the segment, and/or a content duration usable in a slot of the segment. The system generates a configuration file that includes the metadata and the configuration, determines the second content based at least in part on the configuration file, and sends data about the first content and the second content to the device.

20 Claims, 14 Drawing Sheets

RUNTIME DETERMINATION OF A CONFIGURATION FILE USABLE FOR CONTENT PRESENTATION

BACKGROUND

A network service may be accessible to a computing device. Content provided by the network service can be presented by the computing device. For example, the network service includes a content streaming service for movies, television shows, and/or other multimedia playback. The content presented by the computing device can be movie content, television show content, and/or other multimedia content. This content can also be augmented with additional content that may be of interest to an operator of the computing device.

BRIEF DESCRIPTION OF THE DRAWINGS

Various embodiments in accordance with the present disclosure will be described with reference to the drawings, in which.

DETAILED DESCRIPTION

Figure 1:
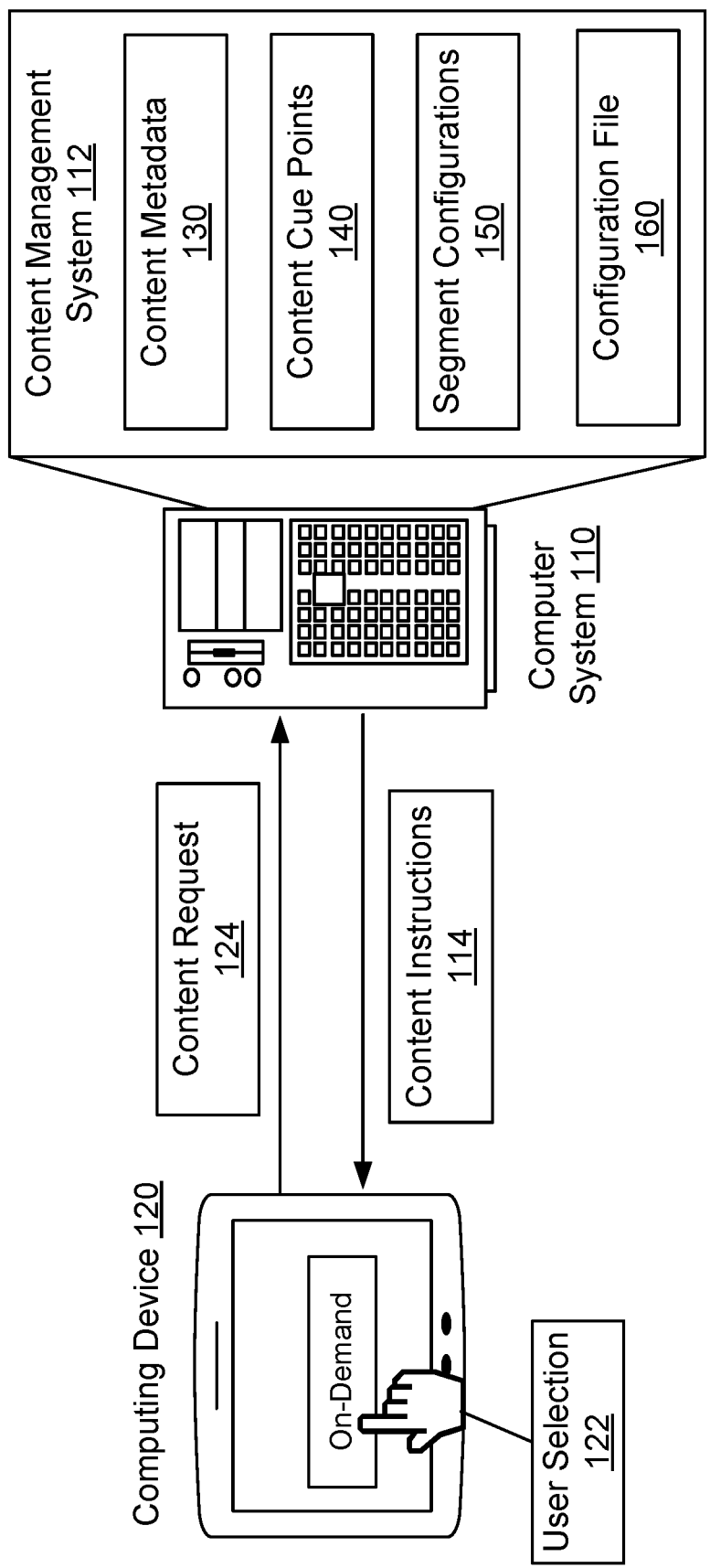
FIG. 1 illustrates an example of a computer system having a content management system, according to a particular embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to, among other things, generating a configuration file associated with presenting content. The configuration file can be generated based metadata about user-requested content (e.g., a movie) and cue points of the user-requested content. A cue point can indicate a start of a segment (e., and advertisement segment) in which additional content (e.g., an advertisement) can be presented. A computer system can generate a configuration of the segments. In an example, the configuration can include information relating to a length of additional content within each segment, a sequence of additional content among the segments, an allowable duration of additional content within each segment, and/or other suitable information associated with the configuration. The computer system can generate the configuration file that includes the configuration and the metadata. In an example, the computer system can generate the configuration file on-the-fly in response to a request from a computing device for the user-requested content (e.g., at runtime or subsequent to receiving the request). The computer system can determine the full set of additional content based on the configuration file. Additionally, the computer system can send instructions to the computing device about presenting the user-requested content and the determined additional content.

To illustrate, consider an example of streaming a movie using a personal computing device. A computing device of a user can execute a content streaming application that supports a selection of a movie from a content library and video playback functionalities. Upon the selection via the content streaming application, the computing device can transmit a content request to a computer system that hosts a content streaming service accessible via the content streaming application. The computer system can send a response to the computing device, where the response includes instructions to present the requested movie and advertisements in segments available during the presentation of the movie. To do so, the computer system determines metadata and cue points of the movie. Based on the metadata and the cue points, the computer system determines a configuration of the segments and generates a configuration file that includes the metadata and indicates, per segment, a maximum duration of the segment and a maximum number of advertisements usable in the segment, a sequence of advertisement slots per segment, a maximum duration and maximum number of advertisements usable in the an advertisement slot, types of advertisements usable in the slot, among other information. The computer system (e.g. through a bidding and/or reservation process) determine the actual advertisements to use along with the requested movie based on the configuration file. Instructions about the advertisements are included in the response to the computing device.

Embodiments of the present disclosure provide several technical advantages based on a runtime-generated configuration file. For example, the configuration file is dynamically generated at runtime. Doing so allows the configuration file to be adopted to not only the requested content, but also to a context of the request and to targets and/or constraints set by a service provider. Although the configuration file is generated at runtime, the processing to generate this file and execute resolution processes to determine additional content is low latency (e.g., within a few milliseconds). The low latency improves the overall quality of network service (e.g., the service that provides the content based on a request from a computing device of a user) and the overall quality of a content application executing on the computing device (e.g., this application supporting low latency responses to user requests).

In the interest of clarity of explanation, various embodiments are described herein in connection with video content (e.g., movies, television shows, etc.) and advertisements. No limited-audio. any added content that may be of interest to user.

FIG. 1 illustrates an example of a computer system 110 having a content management system 112, according to a particular embodiment. The computer system 110 can include any suitable type or combination of hardware. For example, the computer system 110 can be or include a single computer hardware (e.g., a server), or the computer system 110 can be or include multiple computer hardware (e.g., a server farm). Generally, the computer system 110 can include one or more non-transitory computer-readable storage media, one or more processors, and other suitable components. The one or more non-transitory computer-readable storage media can store code executable by the one or more processors for providing functionalities the content management system 112. Among the functionalities, the content management system 112 can support a content service (e.g., such as a video and/or audio streaming service).

The computer system 110 can be communicatively coupled to a computing device 120 over a data network (not illustrated). The computing device 120 can be operated by a user and include any suitable user device that may be used to request content via the computer system 110. In an example, the computing device 120 can include a personal computing device (e.g., a laptop computer, a desktop computer, a tablet computer, a smartphone, and the like). The computing device 1120 can be associated with a user account and execute a content application. Upon a login via the content application, the content service of the content management system 112 becomes available to the computing device 120. In particular, the content application can support video and/or audio presentation.

A user selection 122 can be received via the content application and can indicate a request for specific content (e.g., a particular movie title or a particular television show episode), referred to as user-requested content or first content. The user selection 122 may cause the computing device 120 to transmit a content request 124 to the computer system 110. This request 124 can indicate the specific content and can be associated with a context. The context can indicate information about the user account, the computing device 120, the content application, the timing of the request, and the like.

The content request 124 can be received by the computer system 110. The content management system 112 can, based on the content request 124, identify the first content, identify additional content (e.g., advertisements, sponsorships, etc.), and generate content instructions 114. The additional content can be content not explicitly requested by the user but that may be of interest to the user and is referred to as targeted content or second content.

The content instructions 114 can include data relating to the first content and the second content, such as their uniform resource locators (URLs) and information for inserting portions of the second content (e.g., the advertisements) during the presentation of the first content. The content instructions 114 can cause the computing device 120 (e.g., the content application) to present the first content and the second content to the entity. In an example, the content management system 112 outputs a configuration file 160 and the computer system 110 generates the content instructions 114 based on the configuration file 160. In particular, the computer system 160 can determine the actual second content (e.g., the actual advertisements) according to the configuration file 160.

To generate the configuration file 160, the content management system 112 can receive or determine (e.g., from a data store or another suitable source) content metadata 130 and content cue points 140. The content metadata 130 can include information about the first content, and the content cue points 140 can include time values, each corresponding to a start of a segment. A portion of the second content (e.g., a subset of advertisement) can be presented during a segment. The presentation of the first content resumes after and end of the segment and continues until a start of the next segment. The content management system 112 can use the content metadata 130, the content cue points 140, and other suitable data, such as the context of the content request 124, to determine or otherwise generate segment configurations 150. The segment configurations 150 can include information relating to each segment and slots per segment (where each slot is usable to present a particular portion of the second content, such as a particular advertisement). The content management system 112 can use the segment configurations 150 to generate the configuration file 160. The configuration file 160 can include the metadata and the configuration.

Figure 2:
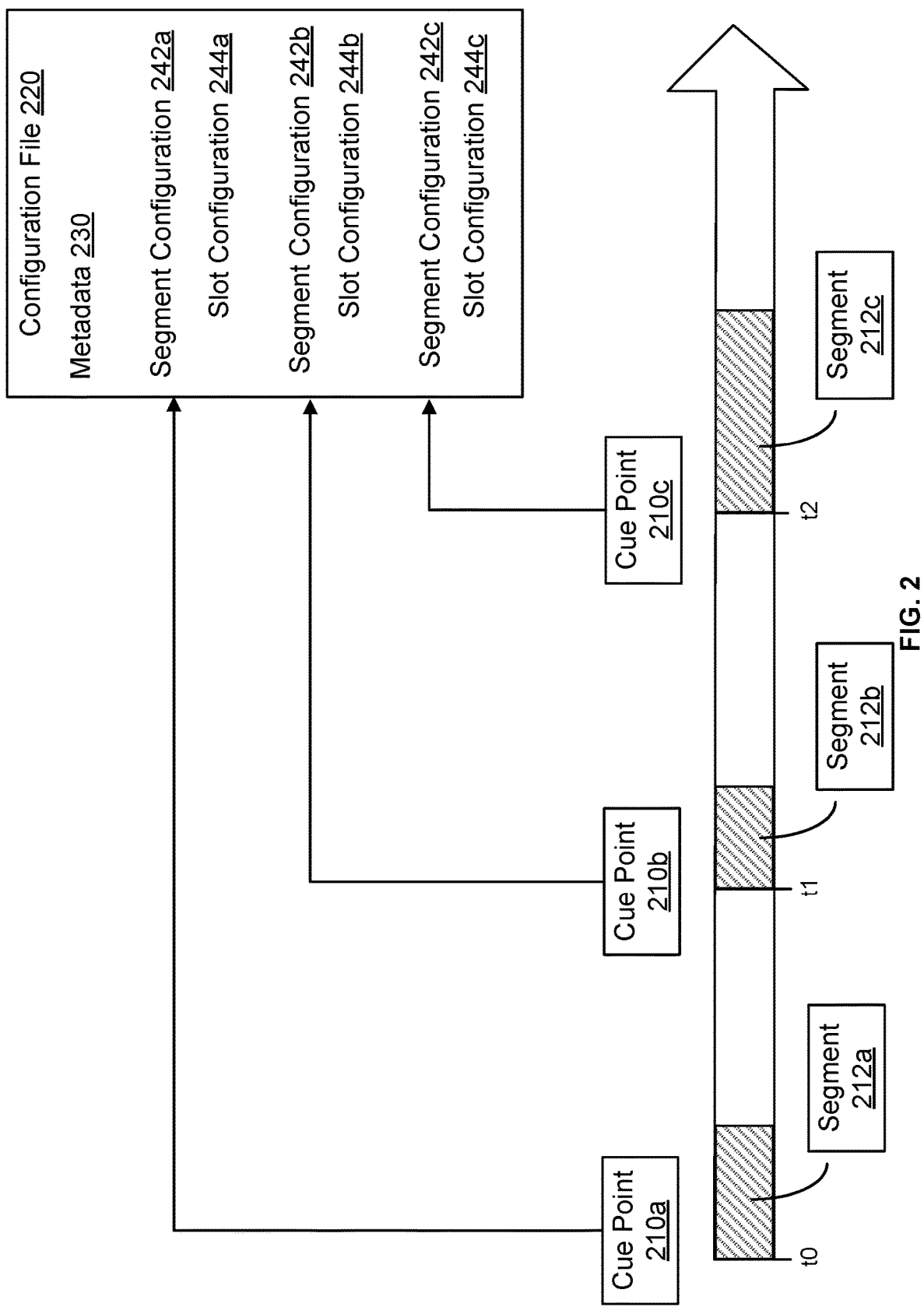
FIG. 2 illustrates an example of a configuration file, according to a particular embodiment.

FIG. 2 illustrates an example of a configuration file 220, according to a particular embodiment. The configuration file 220 may be generated by a content management system (e.g., the content management system 112 of FIG. 1) and may include various information relating to the first content and the second content. In an example, the content management system can include content metadata 230 in the configuration file 220. As illustrated, the configuration file 220 may be generated based on cue points 210a-c, where each cue point indicates a start of a corresponding segment in which a portion of the second content can be presented. In an example, the cue point 210a may correspond to time value t0 indicating that the corresponding segment 212a is a pre-roll segment (e.g., starts before the start of the presentation of the first content), the cue point 210b may correspond to time value t1 indicating that the corresponding segment 212b is a mid-roll segment (e.g., starts after the presentation of a portion of the first content), and the cue point 210c may correspond to time value t2 indicating that the corresponding segment 212c is also a mid-roll segment (e.g., starts after the presentation of another portion of the first content). Other types of segments are possible, such as a post-roll segment (e.g., starts after the presentation of the last portion of the content). The configuration file 220 can be generated based on any other suitable numbers (e.g., less than three or more than three) of cue points 210.

In an example, the configuration file 220 can include the content metadata 230 segment configurations 242a-c and slot configurations 244a-c, or other suitable information. The configuration file 220 can list the segments based on the timing of the cue points 210a-c to indicate a sequence of segments and can include the timing in the segment configurations 242a-c. The segment configurations 242a-c can correspond to the segments 240a-c, respectively, and can each include information that may configure the segments 240a-c. In an example, the information can indicate, per segment, a format (e.g., linear or non-linear) and type (e.g., standard or non-standard) of the segment, an insertion point in the first content (e.g., pre-roll, mid-roll, post roll), a maximum number of advertisements can be inserted, a maximum duration of such advertisements, a maximum duration of the segment, an order of the segment in the sequence of segments, the timing of the corresponding cue point, among other things. Each of the slot configurations 244a-c can correspond to the configuration of one or more slots per segment of the segments 240a-c. A slot configuration can include information that may configure the slot. In an example, the information for a slot in a segment includes an order of the slot in the sequence of slots within the segment, a minimum duration of an advertisement that can be used in the slot, a maximum duration of an advertisement that can be used in the slot, the maximum number of advertisements that can be used in the slot, and a constraint on the usable advertisement(s) beyond number and duration constraints. The constraint can be the type of advertisement (e.g., whether reserved to an advertiser or available for bidding from multiple advertiser, whether the slot can be shared among multiple advertisers, and the like).

The configuration file 220 can be used by an advertisement system to select or otherwise generate the actual second content (e.g., advertisements, sponsorships, etc.) for presenting with the first content. different file formats can be used for the configuration file 220 includes, for example, A Programming Language (APL) format, an Extensible Markup Language (XML) format, or any other format. One example of the configuration file 220 can include the below, with specific configuration annotated in italics.

```
{
   "Configuration File": {//correspond to configuration file 220
      "content Metadata": {//corresponds to metadata 230
         "genre": [
            "HORROR",
            "COMEDY"
         ],
         "rating": null,
         "duration In Milliseconds": 72000000,
         "content Type": "MOVIE"
      },
      "Segments": [
         {//corresponds to segment 212a
            "Segment Format": "LINEAR",
            "Segment Type": "STANDARD",
            "insertion Point": "PRE ROLL",
            "Maximum Number of Advertisements": 0,
            "Maximum Duration of Advertisements in Milliseconds": 0,
            "Maximum Duration of Segment in Milliseconds": 0,
            "Cue Point Timing": 0,
            "Segment Sequence": 0,
            "Slots": [
               }
               "Slot Sequence": 0,
               "Minimum Advertisement Duration in Milliseconds": 0,
               "Maximum Advertisement Duration in Milliseconds": 15000,
               "Maximum Number of Advertisements": 0,
               "Constraint": null
            },
            {
            "Slot Sequence": 1,
            "Minimum Advertisement Duration in Milliseconds": 0,
            "Maximum Advertisement Duration in Milliseconds": 30000,
            "Maximum Number of Advertisements": 0,
            "Constraint": null
            }
         ]
      },
      {//corresponds to segment 212b
         "Segment Format": "LINEAR",
         "Segment Type": "STANDARD",
         "Insertion Point": "MID_ROLL",
         "Maximum Number of Advertisements": 0,
         "Maximum Duration of Advertisements in Milliseconds": 0,
         "Maximum Duration of Segment in Milliseconds": 0,
         "Cue Point Timing": 4004235,
         "Segment Sequence": 1,
         "Slots": [
            {
               "Slot Sequence": 0,
               "Minimum Advertisement Duration in Milliseconds": 0,
               "Maximum Advertisement Duration in Milliseconds": 15000,
               "Maximum Number of Advertisements": 0,
               "Constraint": null
            },
            {
               "Slot Sequence": 1,
               "Minimum Advertisement Duration in Milliseconds": 0,
               "Maximum Advertisement Duration in Milliseconds": 30000,
               "Maximum Number of Advertisements": 0,
               "Constraint": null
            }
         ]
      },
      {//corresponds to segment 212c
         "Segment Format": "LINEAR",
         "Segment Type": "FLEXIBLE",
         "Insertion Point": "MID_ROLL",
         "Maximum Number of Advertisements": 2,
         "Maximum Duration of Advertisements in Milliseconds": 30000,
         "Maximum Duration of Segment in Milliseconds": 60000,
         "Cue Point Timing": 28292360,
         "Segment Sequence": 2,
         "Slots": null
      },
      {.
```

Figure 3:
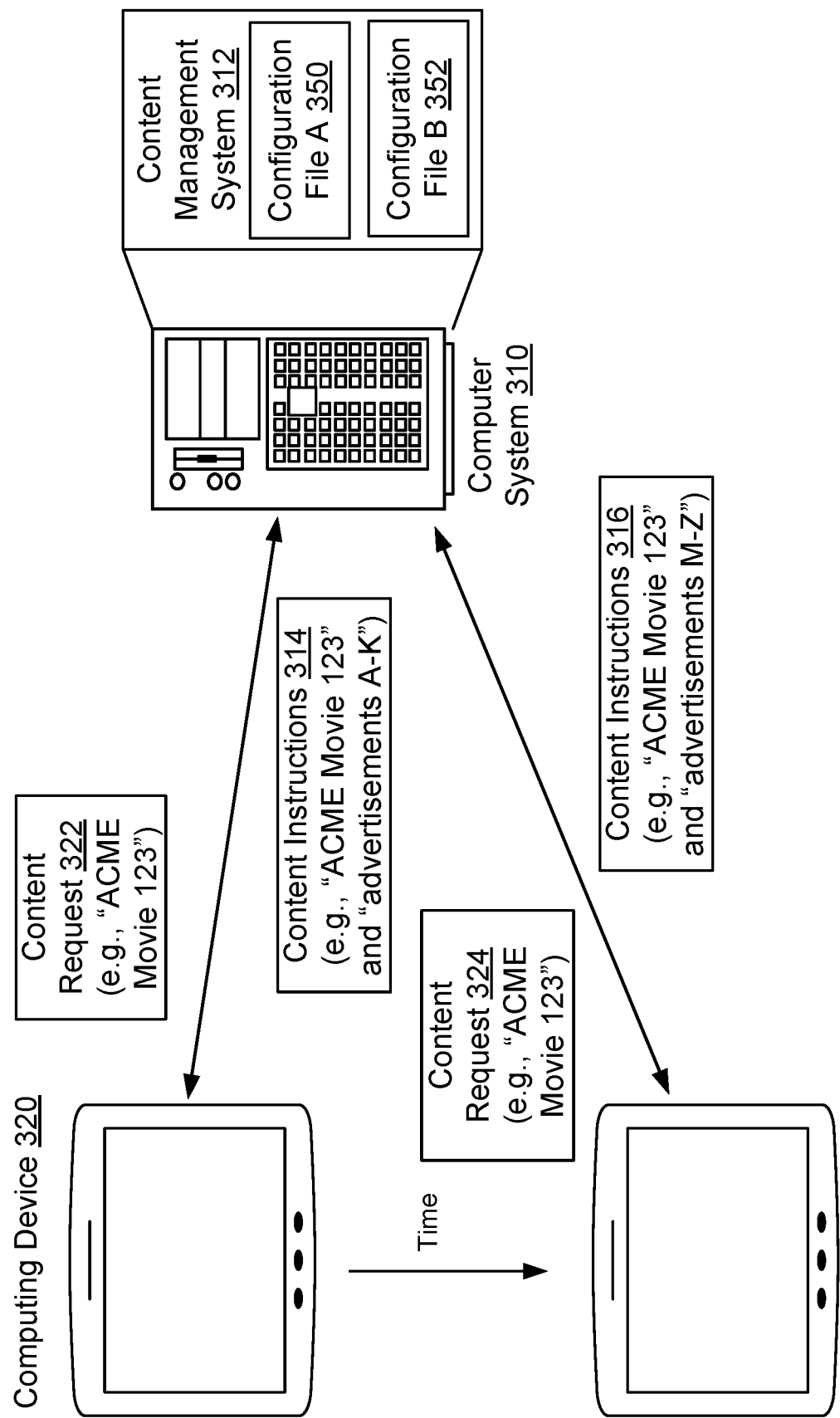
FIG. 3 illustrates an example of a set of similar content requests at different times, according to a particular embodiment.

FIG. 3 illustrates an example of a set of similar content requests at different times, according to a particular embodiment. A computing device 320 can be associated with a user account and operated by a user for executing a content application to request and present first content such as a movie or other suitable multimedia in association with the user account. At a first time, the user can operate the computing device 320 to request first content (e.g., "ACME Movie 123"). The computing device 320 can transmit a content request 322 to a computer system 310, which may include a content management system 312. The content management system 312 can generate configuration file A 350 based on the content request 322, resulting in content instructions 314 back to the computing device 320. The content instructions 314 can include data relating to the first content (e.g., "ACME Movie 123") and second content such as advertisements A-K. The data can cause the computing device 320 to present (e.g., via a display or other suitable output device) the first content and the second content.

At a second time, the first content can be requested again from the computing device 320 via the same content application and in association with the same user account. In this case, the computing device 320 can transmit a content request 324, which may be similar to the content request 322, to the computer system 310, The content management system 312 can generate configuration file B 352 based on the content request 324, resulting in content instructions 316. Despite the two content requests 322 and 324 being made from the same application for the same content and in association with the same user account, the configuration file B 352 can be different from the configuration file A 350 (e.g., the two files 350 and 352 differing at least by one configuration of a segment or a slot) because each of the configurations files 350 and 352 is generated dynamically at run-time. As such, the content instructions 316 can include data relating to the first content (e.g., "ACME Movie 123") and second content such as advertisements M-Z (the number, type, timing, and/or sequencing of such advertisements can be different from what is indicated in the content instructions 314).

Figure 4:
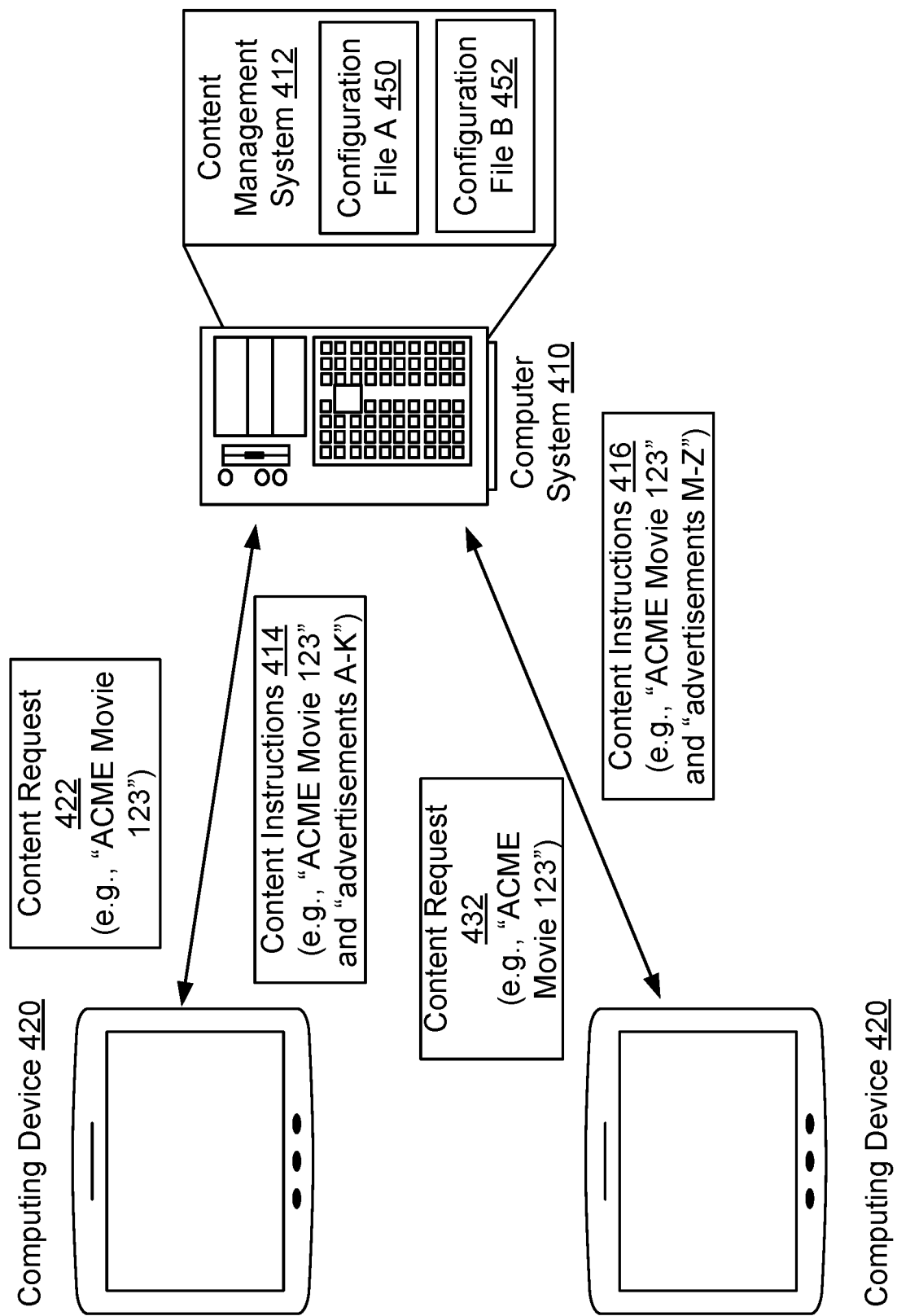
FIG. 4 illustrates an example of a set of similar content requests from different computing devices, according to a particular embodiment.

FIG. 4 illustrates an example of a set of similar content requests from different users, according to a particular embodiment. A first computing device 420 can be associated with a first user account and operated by a first user for executing a first instance of a content application to request and present first content, such as a movie or other suitable multimedia in association with the user account. Similarly, a second computing device 430 can be associated with a second user account and operated by the first user or a second user for executing a second instance of the content application to request and present the same first content. In the example, the first user and the second user may request the first content (e.g., "ACME Movie 123") at a similar time or different times, in a same region or different regions, using the same type or a different type of devices, and/or under similar or different context.

The first computing device 420 can generate a content request 422 that can include data about the first content. The computing device 420 can transmit the content request 422 to a computer system 410, which may include a content management system 412. The content management system 412 can generate configuration file A 450 based on the content request 422 and a context thereof, resulting in content instructions 414. The content instructions 414 can include data relating to the first content (e.g., "ACME Movie 123") and second content such as advertisements A-K. The data can cause the first computing device 420 to present (e.g., via a display or other suitable output device) the first content and the second content.

The second computing device 430 can generate a content request 424 that can include data about the first. The computing device 430 can transmit the content request 424 to the computer system 410. The content management system 412 can generate configuration file B 452 based on the content request 424 and a context thereof, resulting in content instructions 416. Despite the two content requests 422 and 424 being made from instances of the same application and for the same content, the configuration file B 452 can be different from the configuration file A 450 (e.g., the two files 450 and 452 differing at least by one configuration of a segment or a slot) because each of the configurations files 450 and 452 is generated dynamically at runtime. As such, the content instructions 416 can include data relating to the first content (e.g., "ACME Movie 123") and second content such as advertisements M-Z (the number, type, timing, and/or sequencing of such advertisements can be different from what is indicated in the content instructions 414).

Figure 5:
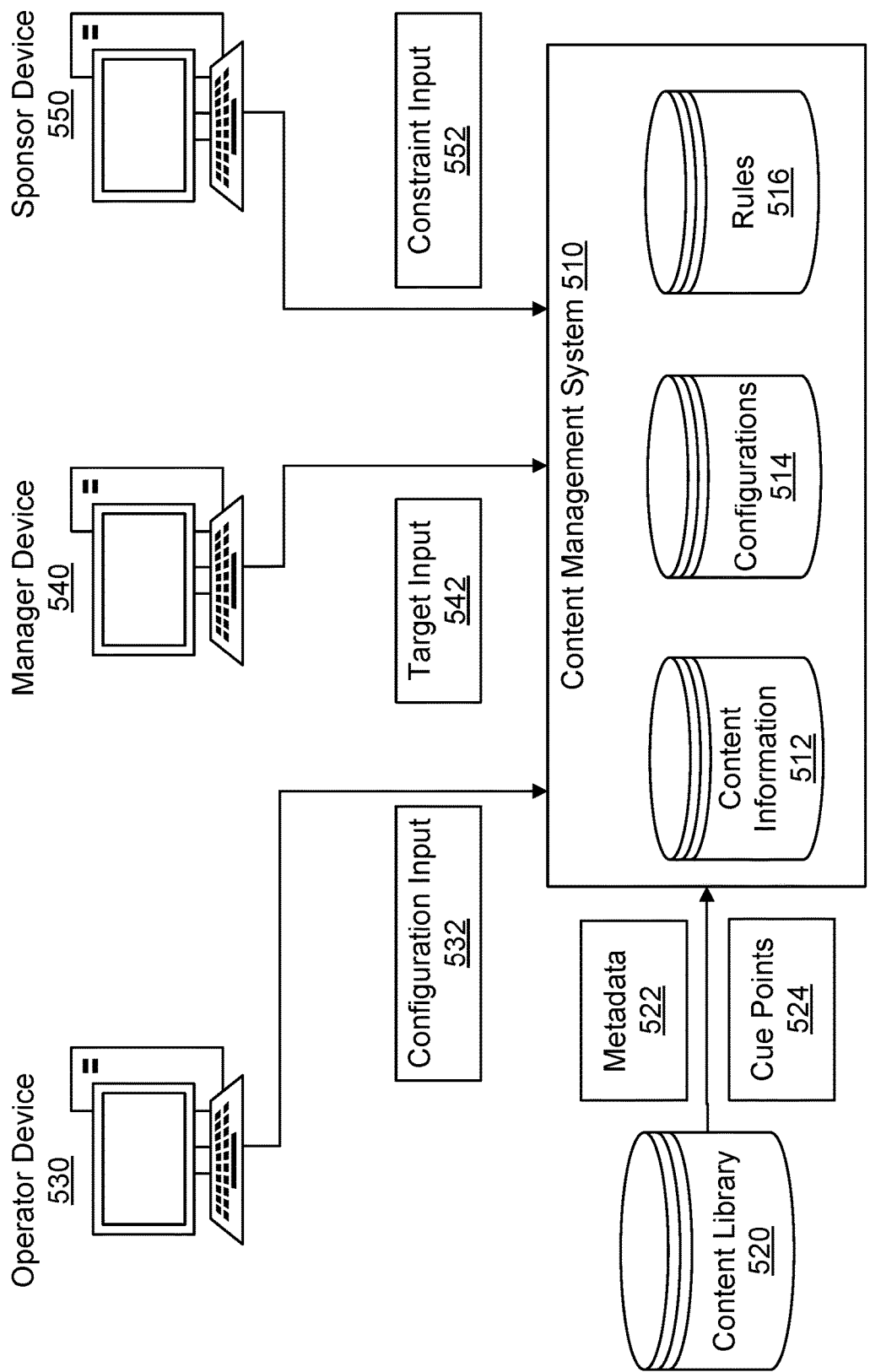
FIG. 5 illustrates an example of a content management system with input for determining a configuration file, according to a particular embodiment.

FIG. 5 illustrates an example of a content management system 510 with input for determining a configuration file (e.g., the configuration file 220), according to a particular embodiment. The content management system 510 can store content information 512, configurations 514, and rules 516 in one or more data stores. The content information 512 may correspond to movies, television shows, and/or other multimedia files available to a user account via a content application. The configurations 514 can include various segment and slot configurations associated with the content information 512 and usable to generate configuration files. The rules 516 can include various rules usable to determine a particular configuration of the configurations 514 to use to generate, at run time, the a configuration file.

The content management system 510 can be communicatively coupled to a content library 520, an operator device 530, a manager device 540, and a sponsor device 550. The content library 520 can include data about movies, television shows, and/or other multimedia files that include particular files available to the user account via the content application. The content management system 510 can receive metadata 522 and cue points 524 from the content library 520. The metadata 522 can include information (e.g., type of content, duration, audience or audience size, rating, and other suitable information) about the about the available files, and the cue points 524 can indicate, for each available file (e.g., each movie, television show episode, etc.), timing of segments that can be used for presenting targeted content.

The operator device 530 may receive user input that defines and/or edits, at least in part, a configuration of a segment, a slot within the segment, multiple slots within the segment, or multiple segments. The configuration can be specific to a file (e.g., a movie or a television episode), to a genre of content (e.g., horror movies), to a type of offered content (e.g., movies sponsored by an advertiser), and the like. Such user input is sent as configuration input 532 to the content management system 510 that stores the configuration as part of the configurations 514 and associates the configuration with the relevant file(s) having information in the content information 512.

The manager device 540 may receive user input that defines and/or edits a target to use in association with presenting targeted content, such as advertisement loads (e.g., the number of advertisements, the number of segments, and the like). The target can be specific to a file, a genre of content, a type of offered content, and the like. Such user input is sent as target input 542 to the content management system 510 that stores the target as part of the rules 516 and associates the target with the relevant file(s) having information in the content information 512 and/or the relevant configuration(s) of the configurations 514.

The sponsor device 550 may receive user input that defines and/or edits a constraint to use in association with presenting targeted content, such as type of advertisement (e.g., that a slot in a segment and/or that a segment in a set of segments need to include an advertisement reserved to an advertiser and/or shared among multiple advertisers). The constraint can be specific to a file, a genre of content, a type of offered content, and the like. Such user input is sent as constraint input 552 to the content management system 510 that stores the constraint as part of the rules 516 and associates the constraint with the relevant file(s) having information in the content information 512 and/or the relevant configuration(s) of the configurations 514.

In an example, upon a request from a computing device for a particular file (e.g., a particular movie or television show episode), the content management system 510 can use the content information 512 specific to the requested file (e.g., the corresponding metadata and cue points), the configurations 514, and the rules 516 to generate the configuration file 220 that applies to the requested file. This functionality is further described in the next figure.

Figure 6:
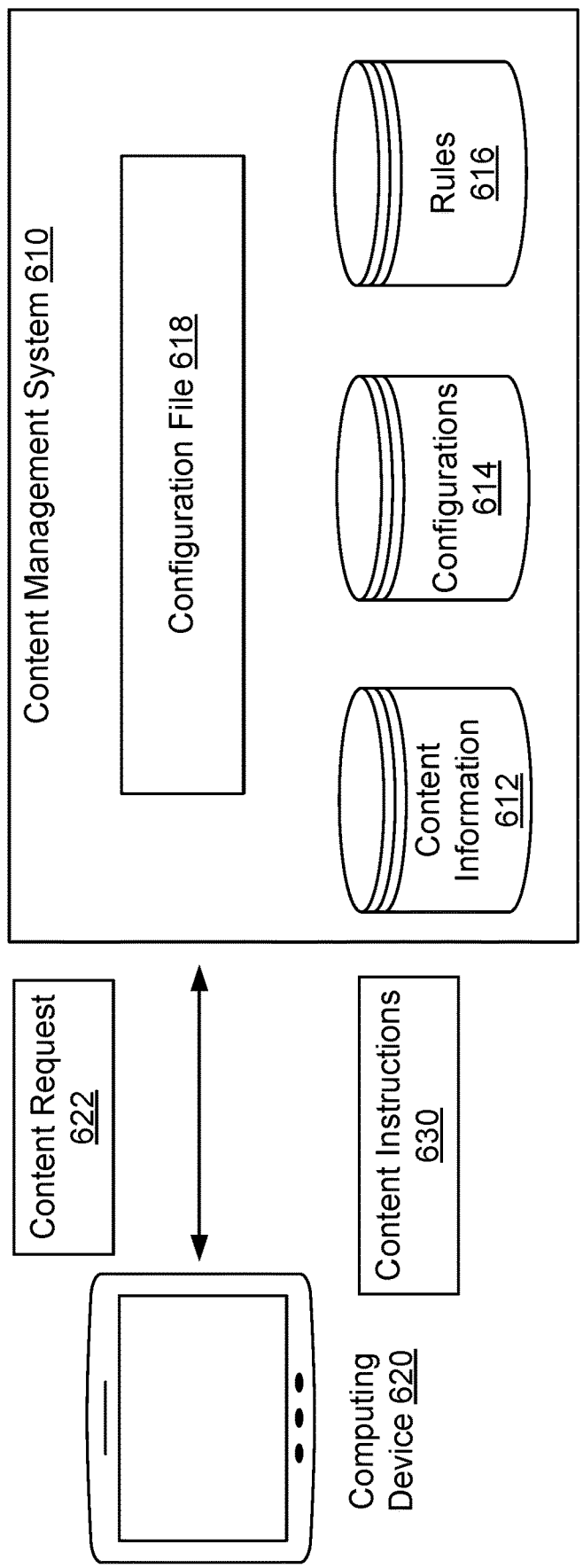
FIG. 6 illustrates an example of a content management system communicatively coupled to a computing device, according to a particular embodiment.

FIG. 6 illustrates an example of a content management system 610 communicatively coupled to a computing device 620, according to a particular embodiment. The computing device 620 may generate and transmit a content request 622 to the content management system 610. The content request 622 may include data about a movie (or any other multimedia file).

The content management system 610 can receive the content request 622 and determined the requested movie. The content management system 610 can then determine the metadata and cue-points of the movie from content information 612 (which is an example of the content information 512). Rules 616 (which are examples of the rules 516) are also used to determine a configuration of configurations 614 (which are examples of the configuration 514). The configuration can be determined based on the movie (e.g., the specific identifier thereof), the genre of the movie (e.g., as identified by the content), a type of offered content for which the movie qualifies, a target specified for the movie, genre, and/or type, a constraint specified for the movie, genre, and/or type, and/or a context of the content request 622 (e.g., information about a user account, a type of the computing device, a type of content application executing on the computing device, time of day, geographic region, etc.). The configuration can include segment configurations and slot configurations usable for presenting advertisement during the presentation of the movie at the computing device 620.

The content management system 610 can generate the configuration file 618 by adding the metadata and the configuration (including the timing of the cue points) thereto. The content management system 610 can output the configuration file 618 to an advertisement system. In turn, the advertisement system determines the advertisements (e.g., via a bidding process and/or a reservation process) that are to be used based on the metadata, the segment configurations, and the slot configurations included in the configuration file 618.

Figure 7:
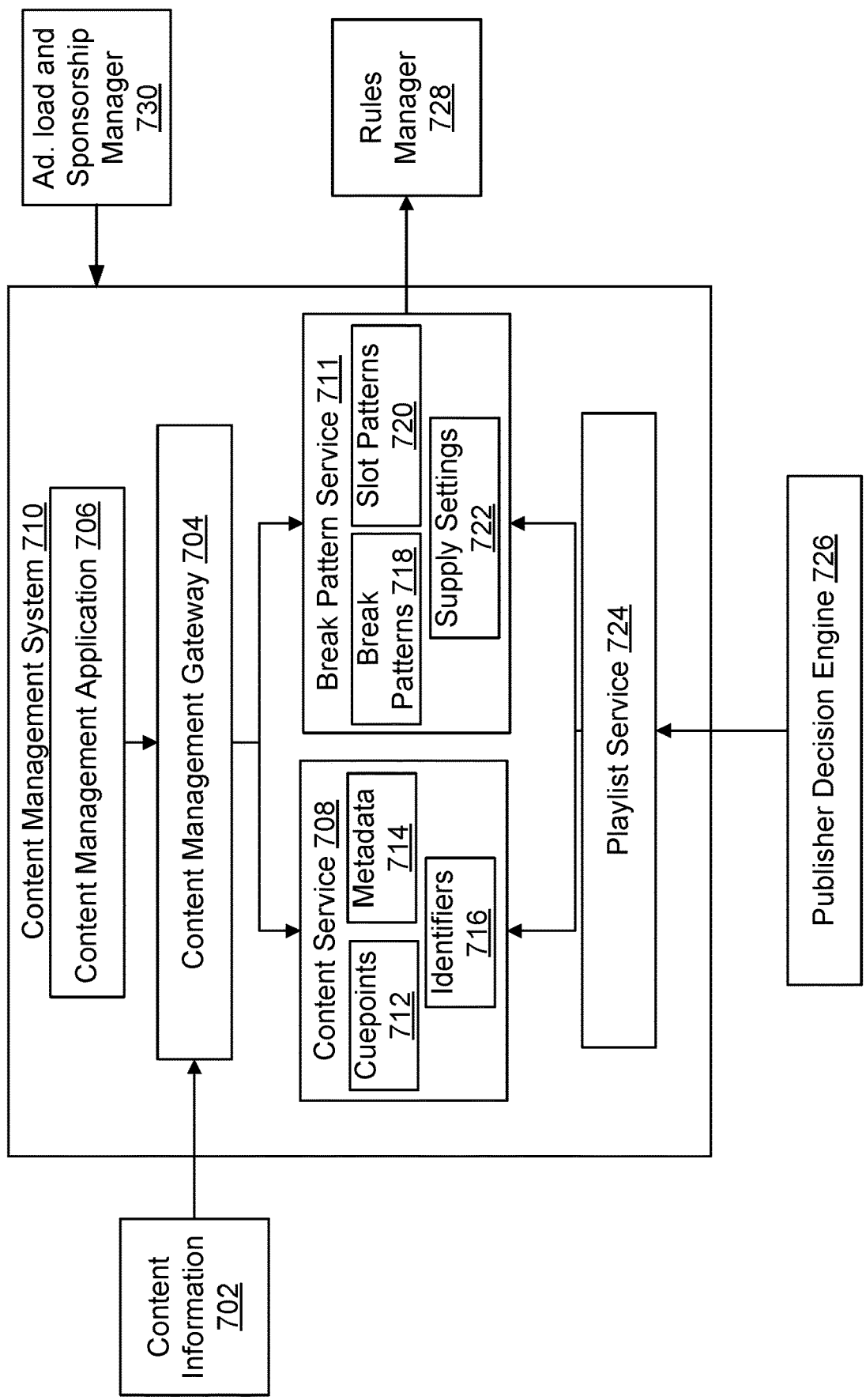
FIG. 7 illustrates an example of a content management system, according to a particular embodiment.

FIG. 7 illustrates an example of a content management system 710, according to a particular embodiment. The content management system 710 can be used (e.g., by the computer system 110 or other suitable computing devices) to generate a configuration file (e.g., the configuration file 220). The content management system 710 can receive content information 702. The content information 702 can include cue points (e.g., the cue points 524), content metadata (e.g., the metadata 522), and other suitable information relating to content available from a content library. The content information 702 can be received by the content management system 710 via a content management gateway 704, which may additionally receive information or data from a content management application 706. The content management application 706 can be used to manage configurations (illustrated in FIG. 7 and described herein below as break patterns), constraints (illustrated in FIG. 7 and described herein below supply settings), content metadata, content classifications, or any suitable combination thereof.

The content management gateway 704 can, in an example, be a backend service usable by the content management system 710. The content management gateway 704 can validate actions taken by the content management system 710 (or by other entities on behalf of the content management system 710). The content management gateway 704 can aggregate data from various sources. In an example, the content management gateway 704 can make and/or receive a set of calls (e.g., API calls) for receiving data from various sources such as a content service, a break pattern service, a supply setting service, and the like. The content management gateway 704 can perform one or more data transformations, in an example, to transform ingested data (e.g., metadata and cue points) into a readable and/or editable format. The content management gateway 704 may be communicatively coupled to a content service 708 and a break pattern service 711.

The content service 708 can perform various management tasks with respect to the content management system 710. In an example, the content service 708 can manage content data including cue points 712, metadata 714, and identifiers 716 (e.g., an identifier can uniquely identify a content file (e.g., a movie, a television show episode, etc.). The content service 708 can manage or otherwise control create, read, update, and delete (CRUD) operations with respect to the cue points 712 and the metadata 714. The content service 708 can (e.g., via one or more API calls) resolve the identifiers 716 (e.g., return an identifier in response to a content request from a computing device, where the request includes a movie title). In an example, an internal identifier of content may be different than an external identifier of the content (e.g., the movie title), and the content service 708 can resolve the difference.

The break pattern service 711 can manage or otherwise CRUD operations with respect to advertisement slots, break patterns, supply settings, and the like. The break pattern service 711 can manage break patterns 718 (e.g., sequence, durations, types, and the like of segments) based on one or more content requests. The break pattern service 711 can additionally manage supply settings 722. In an example, the break pattern service 711 can manage slot patterns 720 (e.g., configurations of advertisement slots).

The content service 708 and the break pattern service 711 can be communicatively coupled to a playlist service 724. The playlist service 724 can be or otherwise include an orchestration service that can retrieve or otherwise receive content data, break patterns, supply settings, and other suitable data or information. The playlist service 724 can apply the break patterns 718 and/or slot patterns 720 (e.g., determined by the break pattern service 711) to the cue points 712 (e.g., determined by the content service 708) and further apply the supply settings 722 (e.g., determined by the break pattern service 711) for generating a playlist (e.g., a configuration file). The playlist may be generated by the playlist service 724 to vend (e.g., to a publisher decision engine 726 in communication with the playlist service 724) the playlist in response to the playlist service 724 receiving a call (e.g., for causing the playlist to be generated) from the publisher decision engine 726.

The break pattern service 711 may additionally be communicatively coupled to (or otherwise in communication with) a rules manager 728. The rules manager 728 may be leveraged by the content management system 710 for rules resolution, rules hosting, and for other purposes or functionalities. In an example, the rules manager 728 can, for a given content request, resolve the break patterns 718, the slot patterns, and/or the supply settings 722 based on rules. The content management system 710 can additionally be communicatively coupled to and advertisement load and sponsorship managers 730 that may manage targets and constraints that can be associated with the break patterns 718, slot patterns 720, and/or supply settings 722.

Figure 8:
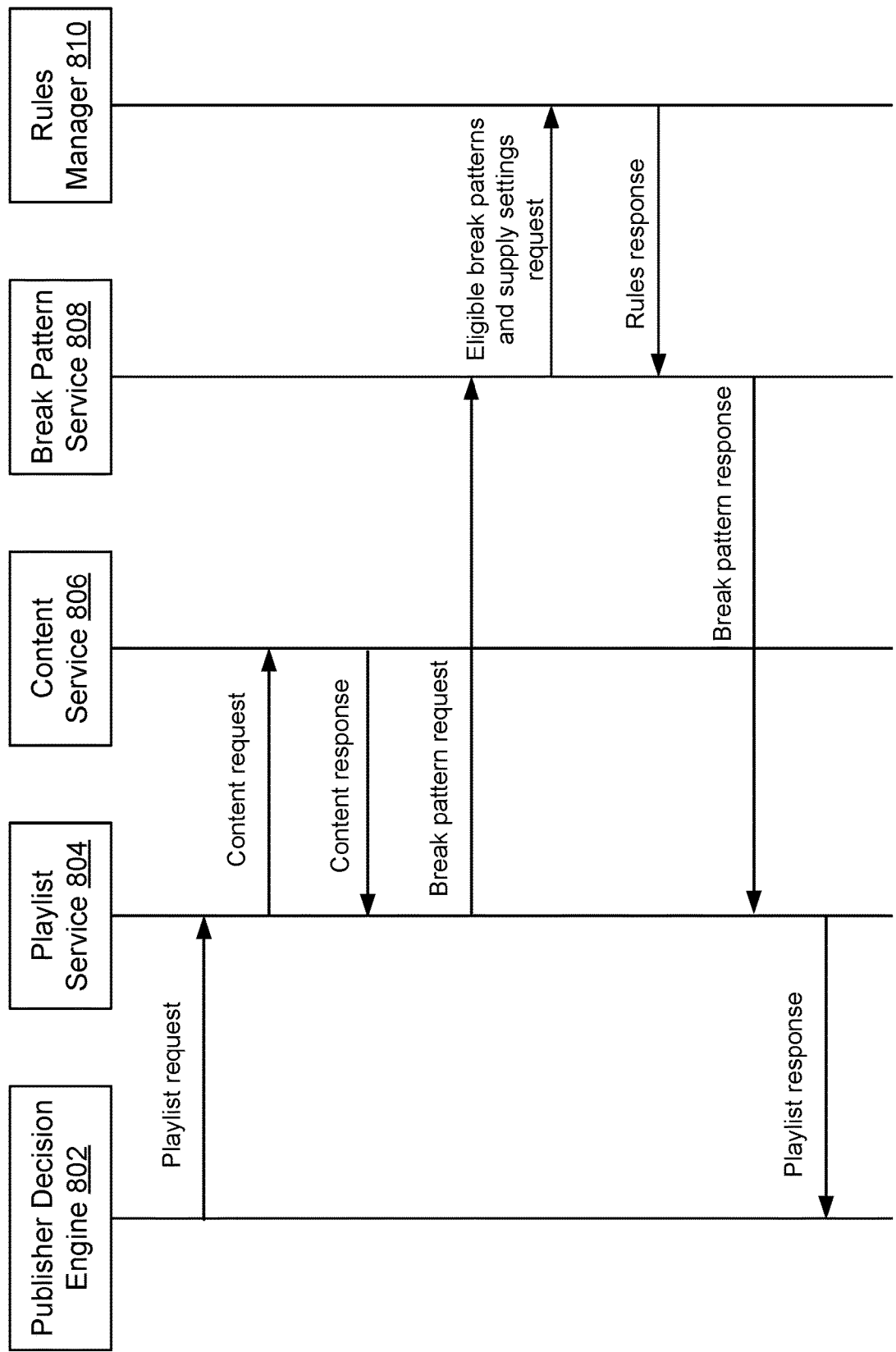
FIG. 8 illustrates an example of a swim-lane flow with respect to components associated with a content management system, according to a particular embodiment.

FIG. 8 illustrates an example of a swim-lane flow with respect to components associated with a content management system, according to a particular embodiment. The content management system can include or otherwise be communicatively coupled to a publisher decision engine 802 (e.g., the publisher decision engine 726), a playlist service 804 (e.g., the playlist service 724), a content service 806 (e.g., the content service 708), a break pattern service 808 (e.g., the break pattern service 711), and a rules manager 810 (e.g., the rules manager 728). Such components of the content management system can exchange data via application programming interfaces (APIs).

The publisher decision engine 802 can generate and send, to the playlist service 804, a playlist request in response to a content request (not shown) sent from a computing device. The playlist request corresponds to a request from the publisher decision engine 802 for returning a playlist to use along with the requested content. the publisher decision engine 802 can send the playlist to an advertisement system (not show) that returns the advertisements to use during the presentation of the requested content. The playlist request can at least identify the requested content. In response, the playlist service 804 sends a content request to the content service 806. The content request can identify the requested content. the content service 806 returns a content response that indicates the metadata, cue points, and identifier of the requested content.

Next, the playlist service 804 can send a break pattern request to the break pattern service 808. This request can trigger the break pattern service 808 to determine the configuration (including a break pattern, slot pattern, and supply settings) to use by the playlist service 804 to generate the playlist. The break pattern request can indicate the metadata, the cue points, and/or a context of the content request. In turn, the break pattern service 808 can determine eligible break patterns and supply settings and can send an eligible break patterns and supply settings request to the rules manager 810. This request can indicate the determined eligible break patterns and supply settings and trigger the rules manager 810 to apply a set of rules to identify a particular break pattern and set of supply settings suitable for the playlist. To do so, the rule manager 810 can check the determined eligible break patterns and supply settings against eligibility criteria (including targets, constraints, and/or associations with particle content titles, content genres, types of content offers, and/or parameters of content request contexts). The rules manager 810 can transmit a rules response 826, which may include the eligible or otherwise applicable break pattern and supply setting, to the break pattern service 808, and the break pattern service 808 can transmit a break pattern response 828 to the playlist service 804. The break pattern response 828 can include resolved and/or decorated break pattern and/or supply settings for the requested content.

The playlist service 804 can apply the break pattern response 828 to a set of cue points associated with the requested content. In an example, the playlist service 804 can suppress a subset of the cue points based on the break pattern response 828 and may apply data within the break pattern response 828 to remaining cue points of the requested content. In response to the playlist service 804 applying the break pattern response 828, the playlist service 804 may generate the playlist. The playlist service 804 can transmit a playlist response 830, which may indicate the playlist, to the publisher decision engine 802.

Figure 9:
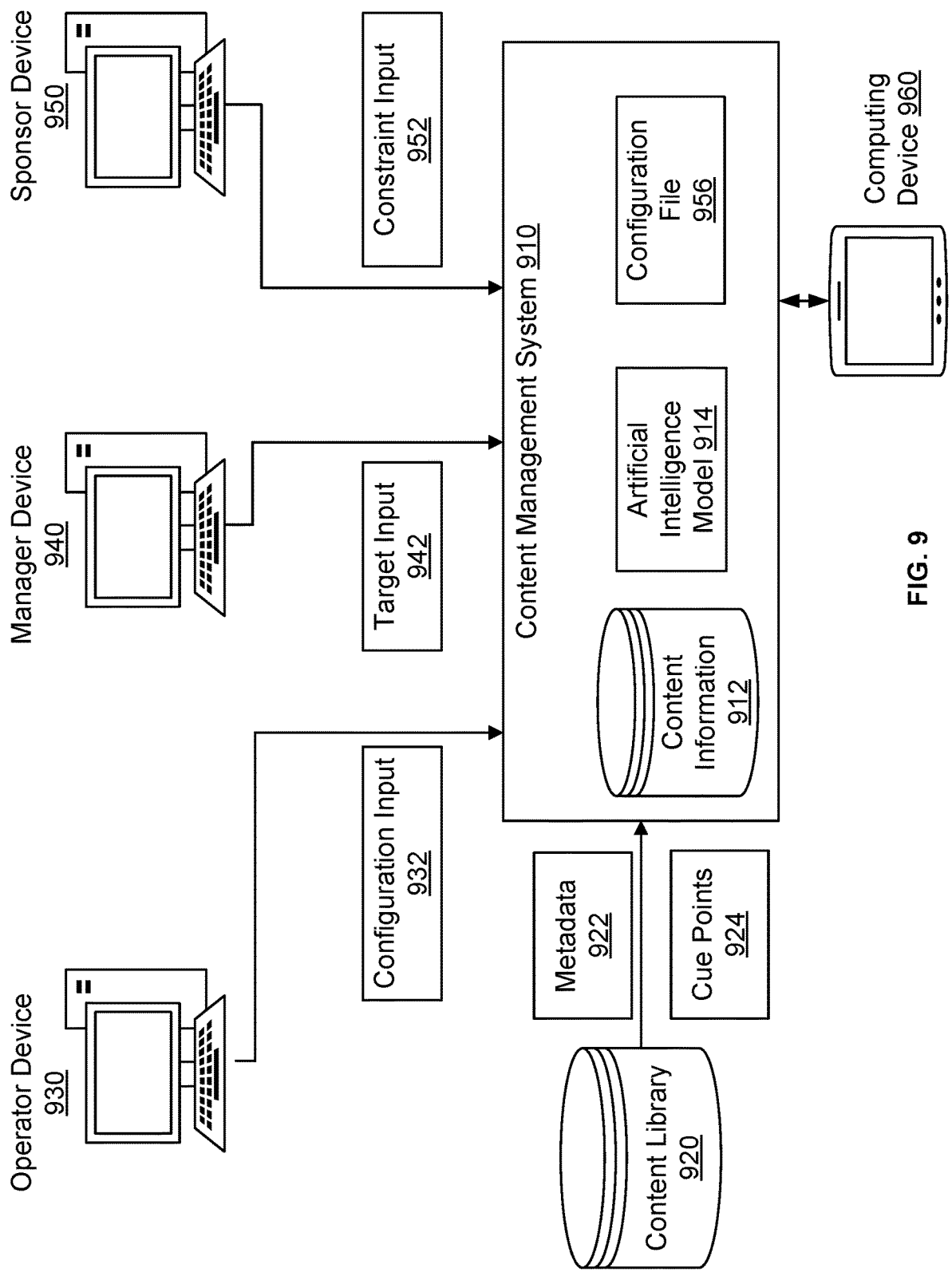
FIG. 9 illustrates an example of a content management system with an artificial intelligence model, according to a particular embodiment.

FIG. 9 illustrates an example of a content management system 910 with an artificial intelligence (AI) model 914, according to a particular embodiment. The content management system 910 can be communicatively coupled to a content library 920 (e.g., the content library 520), an operator device 930 (e.g., the operator device 530), a manager device 940 (e.g., the manager device 540), a sponsor device 950 (e.g., the sponsor device 550), and a computing device 960. Like the content management 510 or 610 of FIGS. 6-10, the content management 910 stores content information 912. However, unlike the content management 510 or 610 of FIGS. 5-6, the content management system 910 need not pre-store configurations of segments and slots. Instead, a configuration can be generated by the AI model 914 in response to a content request.

In an example, a content request can be sent by the computing device 960. The content management system 910 (e.g., a playlist service and a content service thereof, such as in FIG. 8) can determine, from the content information 912, metadata and cue points of the requested content. The metadata and the cue points, along with other information, can be input to the AI model 9914. The other information can indicate a context of the content request, a set of targets defined based on target input 942 received from the manager device, and/or a set of constraints defined based on constraint input 952 received from the sponsor device 950. Optionally, configuration input 932 can be received from the operator device 930 and can indicate desired configurations. Such configurations can also be input to the AI model 914.

The AI model 914 can output a configuration file 956. This configuration file 956 indicates the segment configurations and slot configurations along with any constrains (e.g., break patterns, slot patterns, and supply settings) to use for the content request. In turn, the content management system 910 can output the configuration file 956 to an advertisement system. The advertisement system determines the advertisements (e.g., via a bidding process and/or a reservation process) that are to be used based on the metadata, the segment configurations, and the slot configurations included in the configuration file 956.

Figure 10:
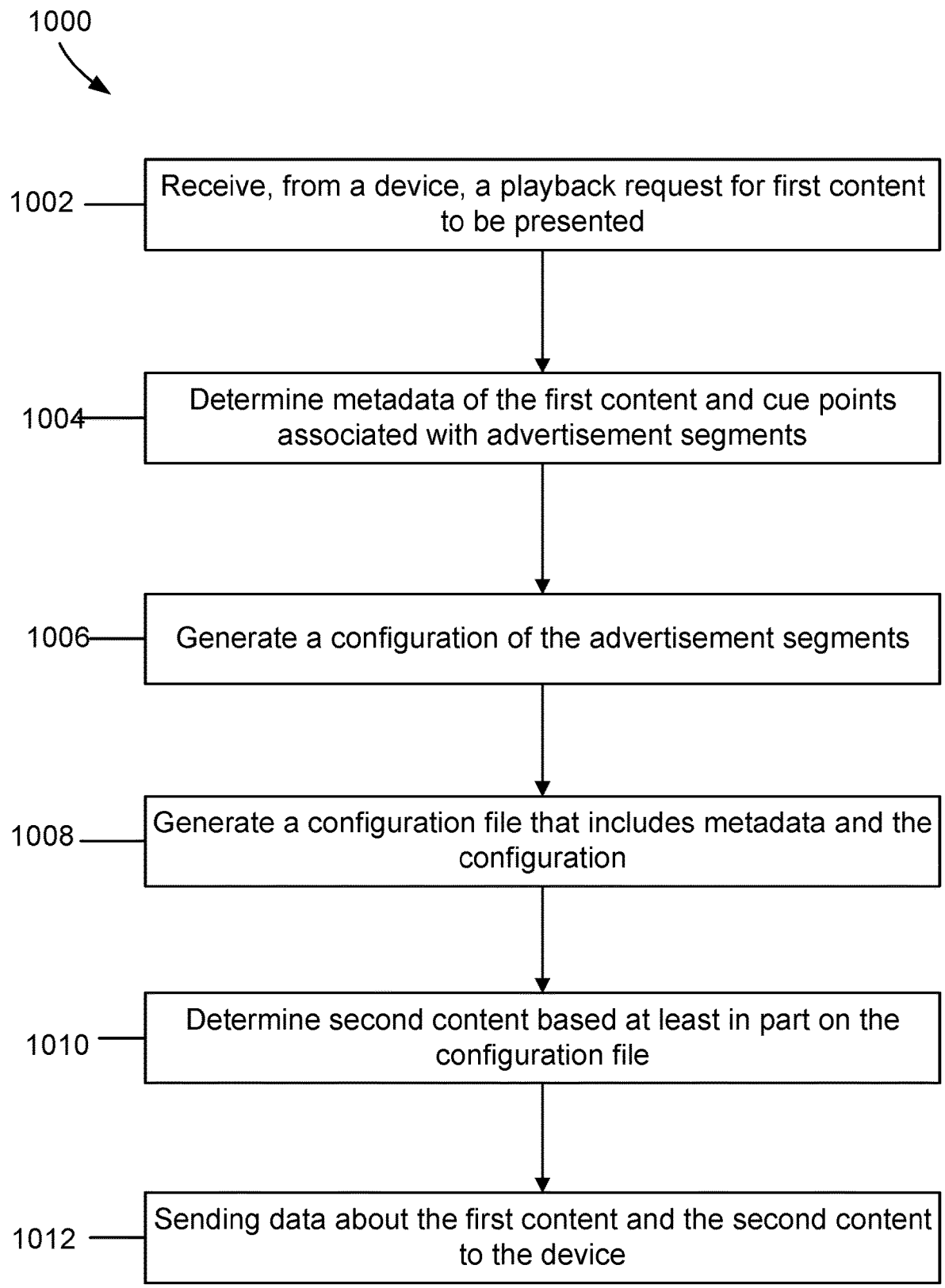
FIG. 10 illustrates an example of a flow for generating a configuration file for presenting first content and second content on a computing device, according to a particular embodiment.

FIG. 10 illustrates an example of a flow 1000 for generating a configuration file for presenting first content and second content on a device, according to a particular embodiment. In an example, the flow 1000 includes operation 1002, where a computer system (e.g., the computer system 110) receives a playback request from a device (e.g., the computing device 120). The playback request can include a request for first content to be presented on the device. The first content can include a movie title, a television show episode, a podcast file, a radio show episode, or any other suitable type of multimedia content presentable on the device. The request can be similar or identical to a content request (e.g., the content request 322) and may include data about the first content.

In an example, the flow 1000 includes operation 1004, where the computer system determines metadata of the first content and cue points associated with advertisement segments that can be used during the presentation of the first content by the device. In an example, the content metadata and the cue points can be retrieved from a data store and correspond to content information received from a content library. The content metadata can include information about the first content such as genre, rating, duration, and the like.

The cue points can include time values along the duration of the first content at which an advertisement segment can be presented.

In an example, the flow 1000 includes operation 1006, where the computer system generates a configuration of the advertisement segments. The computer system can use the content metadata, the cue points, and other suitable data to generate the configurations. The configurations may include segment configurations, slot configurations, and/or constraints.

In an example, the flow 1000 includes operation 1008, where the computer system generates a configuration file that includes the content metadata and the configurations determined at the operation 1006. The configuration file may be dynamic and may be generated at runtime upon receiving the playback request.

In an example, the flow 1000 includes operation 1010, where the computer system determines second content based at least in part on the configuration file. For instance, an advertisement system of the computer system receives the configuration file and determines, based on this file, advertisements to use in the advertisement segments.

In an example, the flow 1000 includes operation 1012, where the computer system sends data about the first content and the second content to the device. The data can include instructions to present the first content and the second content.

Figure 11:
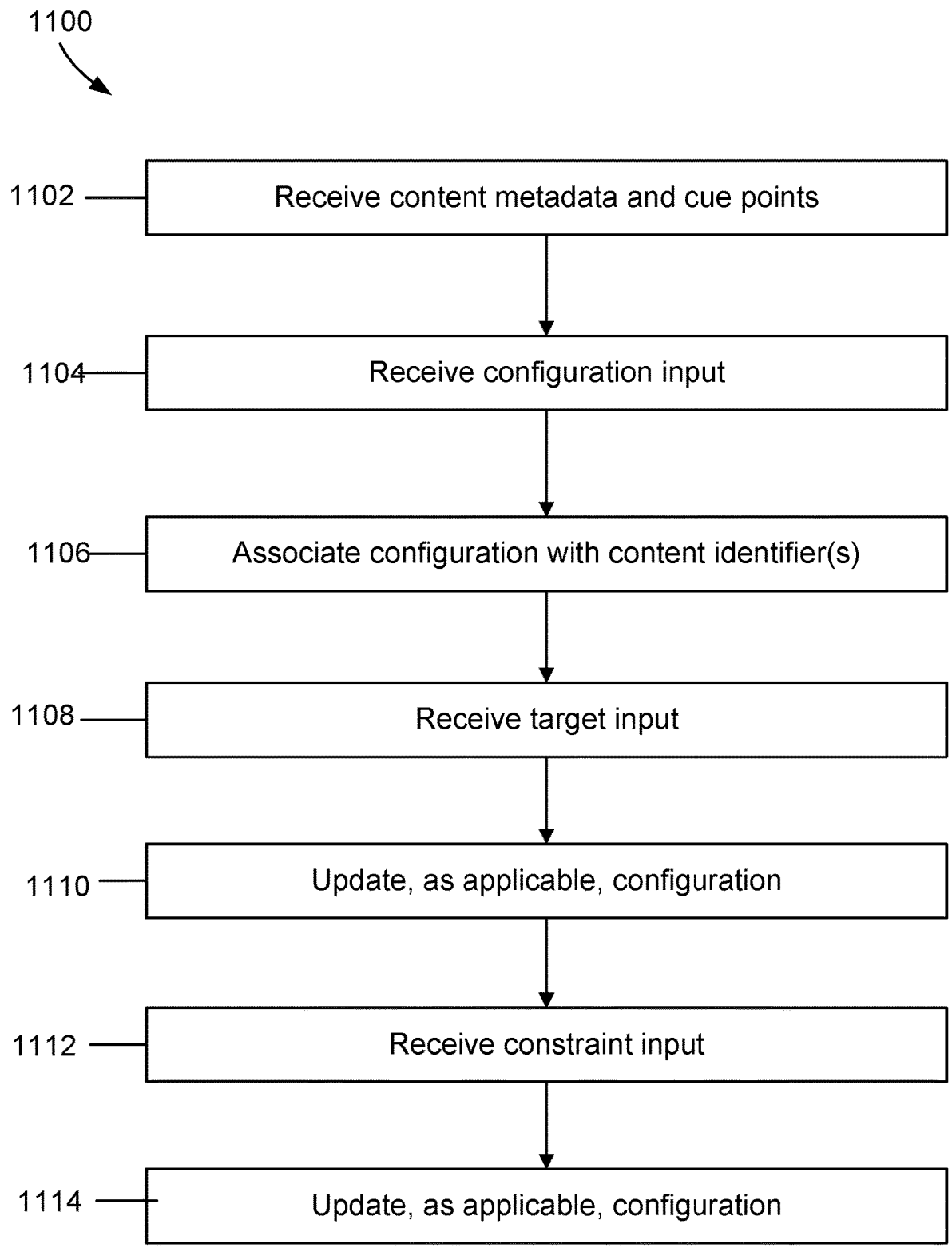
FIG. 11 illustrates an example of a flow for defining configurations, according to a particular embodiment.

FIG. 11 illustrates an example of a flow 1100 for defining configurations, according to a particular embodiment. In an example, the flow 1100 includes operation 1102, where a computer system (e.g., the computer system 110) receives content metadata and cue points. The content metadata and the cue points may correspond to different content files available to a particular type of user accounts and/or a particular content application. The content metadata and the cue points may be received by the computer system from a content library.

In an example, the flow 1100 includes operation 1104, where the computer system receives configuration input. The computer system may receive the configuration input (e.g., the configuration input 532) from an operator device (e.g., the operator device 530). The configuration input may include data about segment configurations and slot configurations that define a configuration for a specific content file, content genre, and/or type of content offer.

In an example, the flow 1100 includes operation 1106, where the computer system associate the configuration with one or more content identifiers. The content identifiers may uniquely identify the content files, the content genre, and/or content offer type to which the configuration apply.

In an example, the flow 1100 includes operation 1108, where the computer system receives target input. The computer system can receive the target input (e.g., the target input 542) from a manager device (e.g., the manager device 540).

In an example, the flow 1100 includes operation 1110, where the computer system updates, as applicable, the configuration. The computer system can determine whether the target impacts the configuration. If so, the configuration is updated. Otherwise, no update may be needed. The update can be to the configuration itself and/or to its association with content file(s), content genre(s), and/or content offer type(s). The impact can for example, edit a segment configuration or a slot configuration or qualify the configuration to another set of content files, content genre, and/or content offer type. For instance, the configuration can indicate a maximum of twenty advertisements that can be used in association with horror movies. The target may indicate a minimum of twenty-five advertisements to use for horror movies and fifteen for comedy movies. In this illustration, the configuration can be re-associated with comedy movies instead of horror movies. In another illustration, the configuration can indicate a maximum of twenty-two advertisements that can be used. The target may indicate a minimum of twenty-four advertisements to use. In this illustration, the configuration can be edited to increase the number of advertisement slots and/or allow for a higher number of maximum advertisements within the slots In an example, the flow 1100 includes operation 1112, where the computer system receives constraint input. The computer system can receive the constraint input (e.g., the constraint input 552) from a sponsor device (e.g., the sponsor device 550) or from other suitable sources for the constraint information.

In an example, the flow 1100 includes operation 1114, where the computer system updates, as applicable, the configuration. Here also, the computer system can determine whether the constraint impacts the configuration. If so, the configuration is updated. Otherwise, no update may be needed. The impact can for example, edit a segment configuration or a slot configuration or qualify the configuration to another set of content files, content genre, and/or content offer type. For instance, the configuration can be associated with a content genre (e.g., horror movies) and indicate that a first slot in a first segment is not reserved and can be bid on by different advertisers. The constraint may indicate that, for the month of October, horror movies are sponsored by an advertiser and, as such, the first slot in the first segment is to be reserved for an advertisement of the advertiser. In this illustration, the configuration can be edited to indicate that the type of the first slot in the first segment is reserved.

Figure 12:
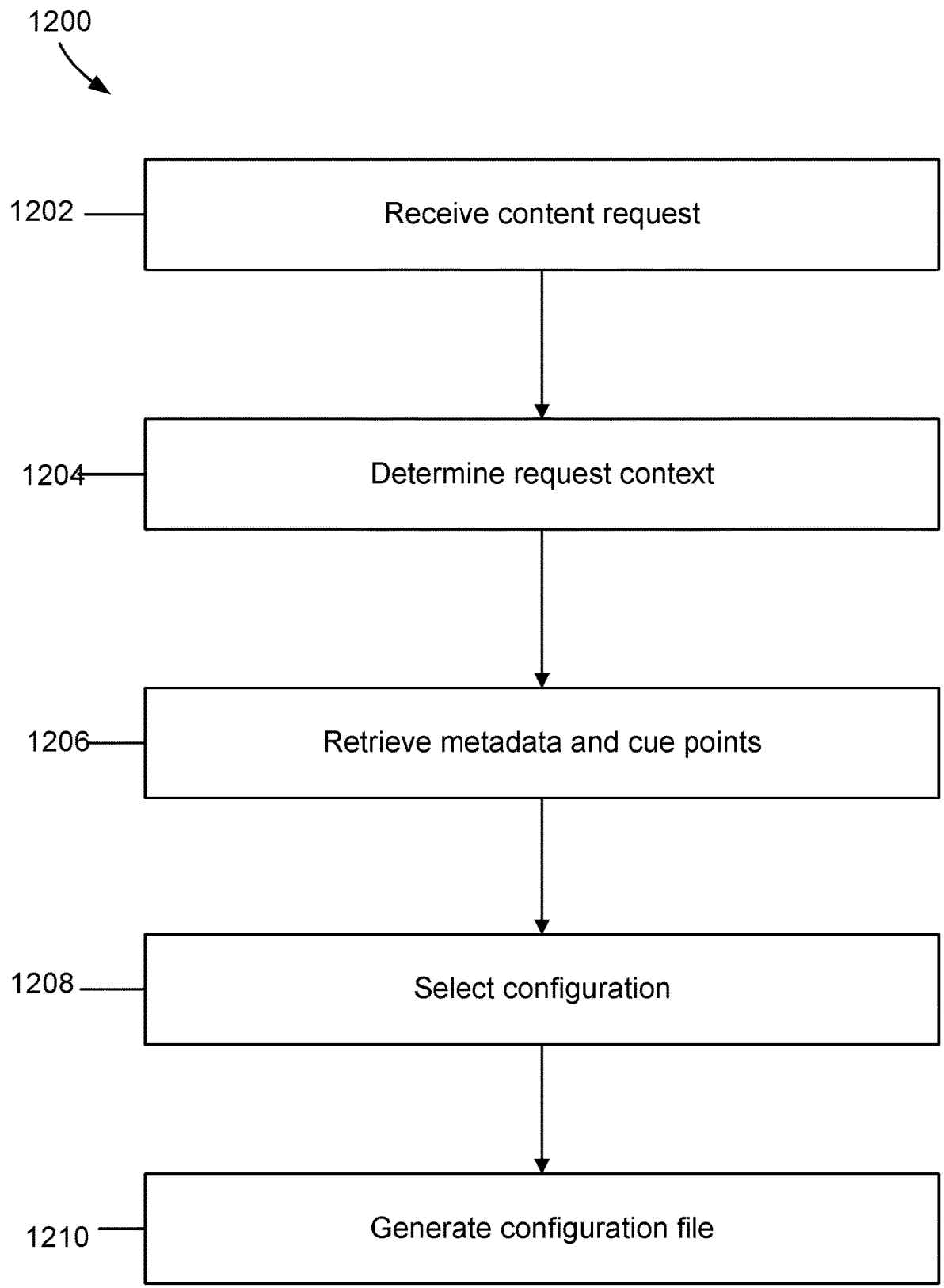
FIG. 12 illustrates an example of a flow for generating a configuration file, according to a particular embodiment.

FIG. 12 illustrates an example of a flow 1200 for generating a configuration file, according to a particular embodiment. In an example, the flow 1200 includes operation 1202, where a computer system (e.g., the computer system 110) receives a content request. The content request can identify first content (e.g., a movie and the like) and can be received from a computing device (e.g., the computing device 120) associated with a user account.

In an example, the flow 1200 includes operation 1204, where the computer system determines a request context. The computer system can determine a context associated with the content request, the user account, the computing device, and/or a content application executing on the computing device. The context can include a time of day, a time of year, an amount of times the first content has been requested by the requesting user, a type of the computing device, a version of the content application, a geographic region of the device, a requested language of the first content, and the like.

In an example, the flow 1200 includes operation 1206, where the computer system receives metadata and cue points. The metadata and the cue points may correspond to the first content. The metadata and the cue points can be retrieved from a data store and correspond to content information received from a content library.

In an example, the flow 1200 includes operation 1208, where the computer system selects a configuration. The configuration can include segment configurations, slot configurations, and constraints. In an example, the configuration is selected from pre-stored configurations based on a set of rules, the content metadata, the cue points, and the content request context. For example, the configuration is associated with eligibility criteria (e.g., identifiers of content files, content genre, content offer types to which the configuration file applies, targets, constraints, and/or contextual parameters). These criteria can be checked against the identifier of the requested content, the content metadata, the cue points, and the content request context to determine that the configuration is selectable.

In an example, the flow 1200 includes operation 1210, where the computer system generates a configuration file. In an example, the computer system generates the configuration file based on the selected configuration and the metadata. The configuration file can be generated dynamically (e.g., at run-time) and in response to each content request received by the computer system.

Figure 13:
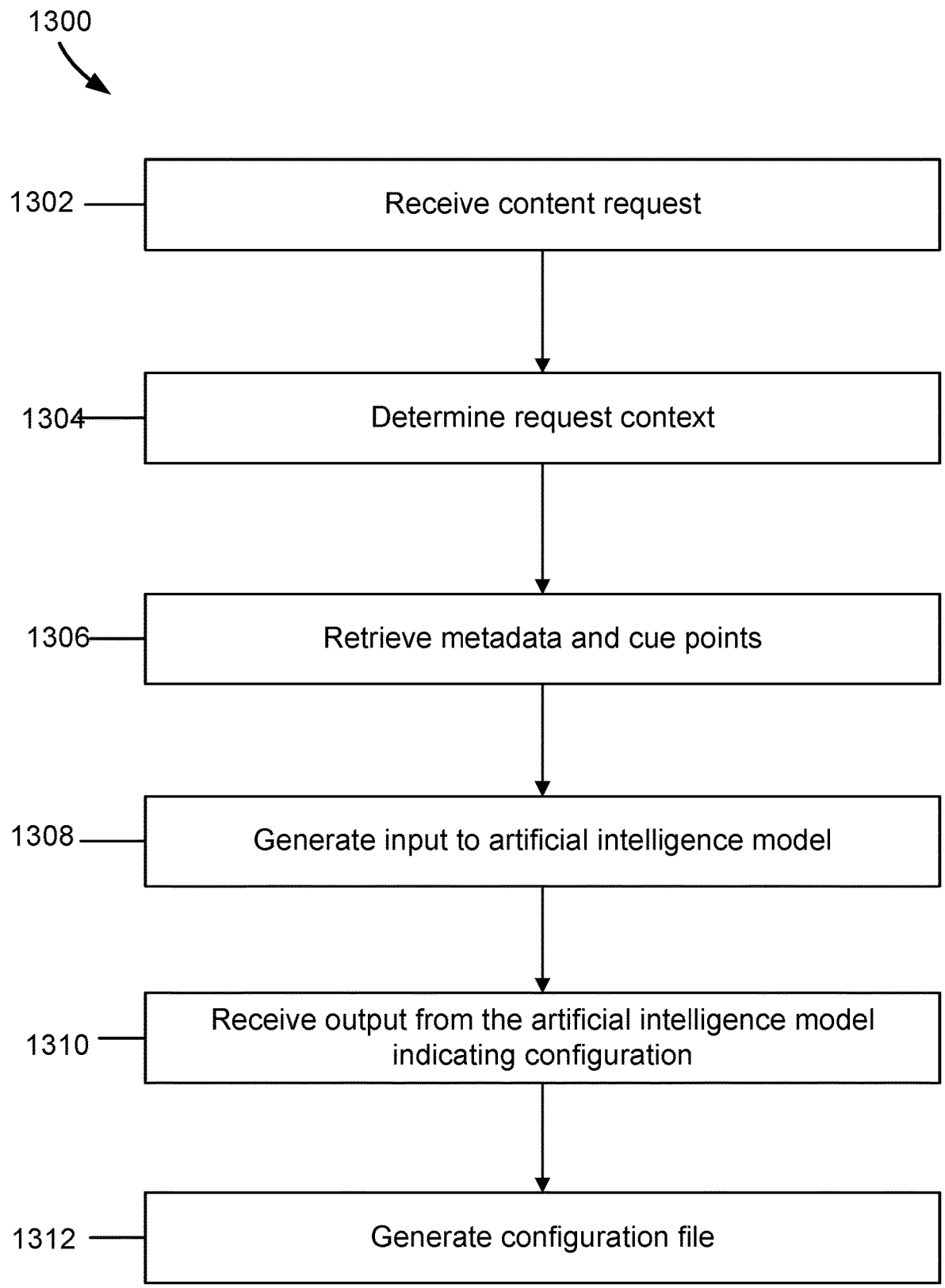
FIG. 13 illustrates an example of a flow for generating a configuration file using an artificial intelligence model, according to a particular embodiment.

FIG. 13 illustrates an example of a flow 1300 for generating a configuration file using an AI model, according to a particular embodiment. In an example, the flow 1300 includes operation 1302, where a computer system (e.g., the computer system 110) receives a content request. The content request can identify first content (e.g., a movie and the like) and can be received from a computing device (e.g., the computing device 120) associated with a user account.

In an example, the flow 1300 includes operation 1304, where the computer system determines a request context. The computer system can determine a context associated with the content request, the user account, the computing device, and/or a content application executing on the computing device. The context can include a time of day, a time of year, an amount of times the first content has been requested by the requesting user, a type of the computing device, a version of the content application, a geographic region of the device, a requested language of the first content, and the like.

In an example, the flow 1300 includes operation 1306, where the computer system receives metadata and cue points. The metadata and the cue points may correspond to the first content. The metadata and the cue points can be retrieved from a data store and correspond to content information received from a content library.

In an example, the flow 1300 includes operation 1308, where the computer system generates input into an AI model. The input can include the content metadata, the cue points, and other information such as the context, any applicable target, any application constraint, and, optionally, possible configurations.

In an example, the flow 1300 includes operation 1310, where the computer system receives output from the AI model indicating a configuration. The AI model may be implemented as convolutional neural network or any other type of machine learning model that is trained to output configurations. Here, the AI model can output the configuration for the content request. The configuration can include segment configurations, slot configurations, and constraints.

In an example, the flow 1300 includes operation 1312, where the computer system generates a configuration file. In an example, the computer system generates the configuration file based on the selected configuration (e.g., from the AI model) and the metadata. The configuration file can be generated dynamically (e.g., at run-time) and in response to each content request received by the computer system.

Figure 14:
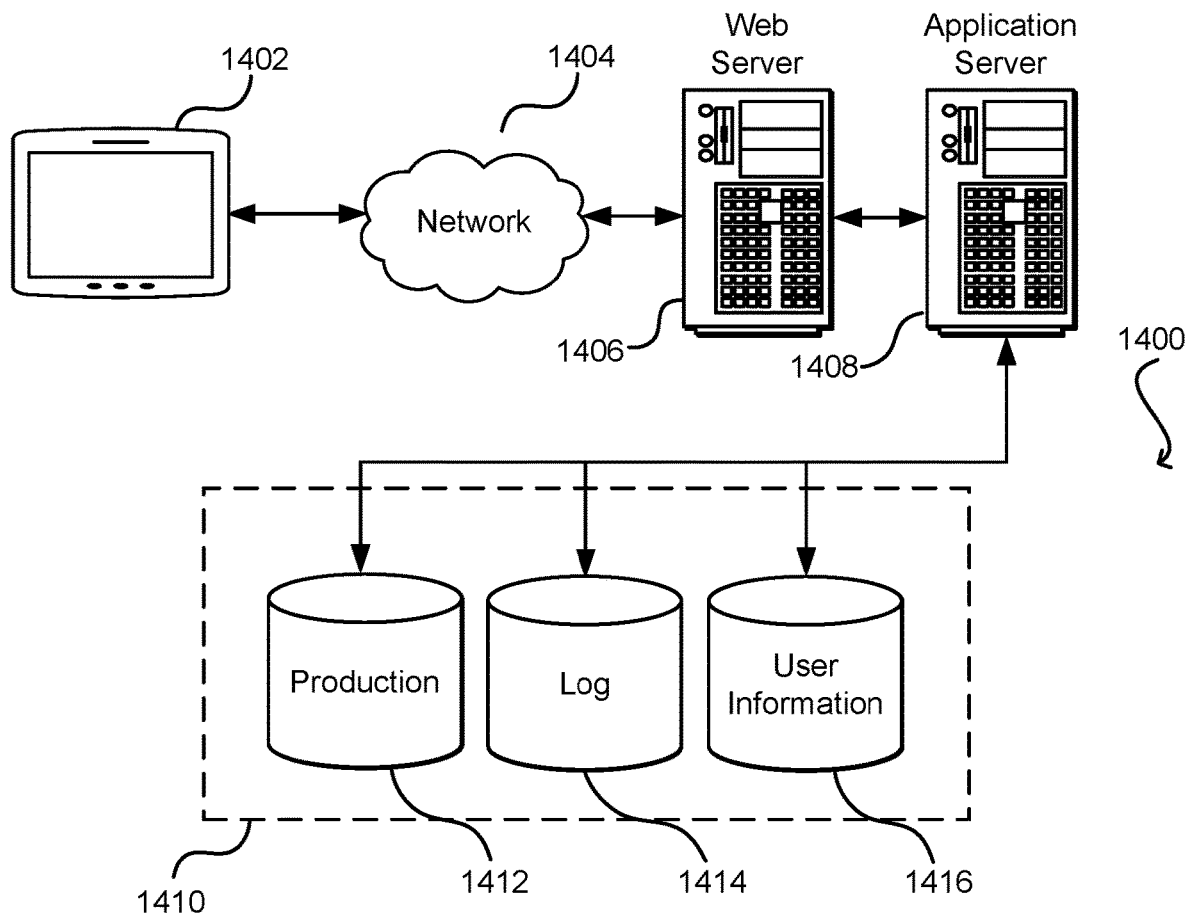
FIG. 14 illustrates an environment in which various embodiments can be implemented.

FIG. 14 illustrates aspects of an example environment 1400 for implementing aspects in accordance with various embodiments. As will be appreciated, although a Web-based environment is used for purposes of explanation, different environments may be used, as appropriate, to implement various embodiments. The environment includes an electronic client device 1402, which can include any appropriate device operable to send and receive requests, messages, or information over an appropriate network 1404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1402 and the application server 1408, can be handled by the Web server. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing production data 1412 and user information 1416, which can be used to serve content for the production side. The data store also is shown to include a mechanism for storing log data 1414, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the computing device 1402. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system (e.g., the example environment 1400) in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from computing devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle °, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable storage media storing instructions that, upon execution on a system, cause the system to perform operations comprising:
   storing, prior to receiving a plurality of playback requests each from one of a plurality of devices, a plurality of segment configurations usable in association with responding to any of the plurality of playback requests;
   receiving, from a device after the plurality of segment configurations are stored, a playback request for first content to be presented by the device, the first content comprising a movie title;
   determining metadata of the first content and cue points associated with advertisement segments, each cue point associated with a corresponding advertisement segment and indicating a start of the corresponding advertisement segment;
   determining, based at least in part on the playback request and a target associated with responding to the playback request, a number of advertisements to be included in second content;
   selecting a configuration from the plurality of segment configurations based at least in part on a determination that the configuration supports the number of advertisements, the configuration comprising per advertisement segment: a duration of the advertisement segment, a sequence of advertisement slots in the advertisement segment, and a duration of an advertisement presentable in an advertisement slot;
   generating a configuration file that includes the metadata and the configuration;
   determining the second content based at least in part on the configuration file, the second content comprising advertisements, each advertisement associated with one of the advertisement segments and one of the advertisement slots; and
   sending data about the first content and the second content to the device, the data causing the device to present the first content and the second content.

2. The one or more non-transitory computer-readable storage media of claim 1, wherein generating the configuration comprises generating a first configuration of a first advertisement segment and a second configuration of a first advertisement slot in the first advertisement segment, and Wherein the second configuration comprises a constraint on a type of advertisement presentable in the first advertisement slot.

3. The one or more non-transitory computer-readable storage media of claim 1, wherein generating the configuration comprises generating a first configuration of a first advertisement segment and a second configuration of a first advertisement slot in the first advertisement segment, wherein the first configuration comprises a maximum advertisement segment duration and a first maximum advertisement duration usable in the first advertisement segment, and wherein the second configuration comprises a second maximum advertisement duration and a minimum advertisement duration usable in the first advertisement segment.

4. The one or more non-transitory computer-readable storage media of claim 1, wherein generating the configuration comprises generating a first configuration of a first advertisement segment and a second configuration of a first advertisement slot in the first advertisement segment, wherein the first configuration comprises a first maximum advertisement number usable in the first advertisement segment, and wherein the second configuration comprises a second maximum advertisement number usable in the first advertisement segment.

5. A computer-implemented method, comprising:
   storing, prior to receiving a plurality of requests each from one of a plurality of devices, a plurality of segment configurations usable in association with responding to any of the plurality of requests;
   receiving, from a device after the plurality of segment configurations are stored, a request for first content to be presented by the device;
   determining metadata of the first content and a cue point indicating a start of a segment in which second content can be presented by the device;
   determining based at least in part on the request and a target associated with responding to the request, a number of segments to be included in the second content;
   selecting a configuration from the plurality of segment configurations based at least in part on a determination that the configuration supports the number of segments, the configuration comprising at least one of: a duration of the segment, a sequence of slots in the segment, or a content duration usable in a slot of the segment, the slot usable to present a portion of the second content;
   generating a configuration file that includes the metadata and the configuration;
   determining the second content based at least in part on the configuration file; and
   sending data about the first content and the second content to the device, the data causing the device to present the first content and the second content.

6. The computer-implemented method of claim 5, wherein receiving the request comprises receiving a playback request for a movie title, wherein generating the configuration comprises generating a first configuration of an advertisement segment and a second configuration of an advertisement slot in the advertisement segment, wherein the first configuration comprises a maximum duration of the advertisement segment and a sequence of advertisement slots, and wherein the second configuration comprises a minimum advertisement duration and a maximum advertisement duration usable in the advertisement slot.

7. The computer-implemented method of claim 5, wherein the request, the configuration, the configuration file, and the data are a first request, a first configuration, a first configuration file, and first data, respectively, and wherein the computer-implemented method further comprises:
   receiving, from the device, a second request for the first content;
   generating, based at least in on the metadata and subsequent to the second request, a second configuration of the segment, the second configuration being different than the first configuration;
   generating a second configuration file that includes the metadata and the second configuration;
   determining third content based at least in part on the second configuration file; and
   sending second data about the first content and the third content to the device, the second data causing the device to present the first content and the third content.

8. The computer-implemented method of claim 5, wherein the device, the request, the configuration, the configuration file, and the data are a first device, a first request, a first configuration, a first configuration file, and first data, respectively, and wherein the computer-implemented method further comprises:
   receiving, from a second device, a second request for the first content;
   generating, based at least in on the metadata and subsequent to the second request, a second configuration of the segment, the second configuration being different than the first configuration;
   generating a second configuration file that includes the metadata and the second configuration;
   determining third content based at least in part on the second configuration file; and
   sending second data about the first content and the third content to the device, the second data causing the second device to present the first content and the third content.

9. The computer-implemented method of claim 5, further comprising:
   prior to receiving the request:
      determining a library of content;
      receiving the metadata of the first content and the cue point based at least in part on the first content being identified in the library; and
      storing the metadata and the cue point in association with an identifier of the first content; and
   subsequent to receiving the request:
      determining, based at least in part on the request, the identifier of the first content; and
      retrieving the metadata and the cue point based at least in part the identifier.

10. The computer-implemented method of claim 5, further comprising:
    determining a context associated with the request, wherein the configuration is generated further based at least in part of the context.

11. The computer-implemented method of claim 5, wherein the plurality of segment configurations are stored prior to the request being received.

12. The computer-implemented method of claim 5, wherein the configuration is included in the plurality of segment configurations based at least in part on an output of an artificial intelligence model.

13. The computer-implemented method of claim 11, wherein the configuration is selected by at least matching eligibility criteria associated with the configuration with parameters of the metadata and a context associated with the request.

14. The computer-implemented method of claim 11, wherein determining the number of segments comprises
    determining a number of advertisements to be included in the second content, wherein the configuration is selected based at least in part on a determination that the configuration supports the number of advertisements.

15. The computer-implemented method of claim 12, further comprising:
    generating an input to the artificial intelligence model, wherein the output includes the configuration.

16. A system comprising:
    one or more processors; and one or more memory storing computer-readable instructions that, upon execution by the one or more processors, configure the system to:
   store, prior to receiving a plurality of requests each from one of a plurality of devices, a plurality of segment configurations usable in association with responding to any of the plurality of requests;
   receive, from a device after the plurality of segment configurations are stored, a request for first content to be presented by the device;
   determine metadata of the first content and a cue point indicating a start of a segment in which second content can be presented by the device;
   determine, based at least in part on the request and a target associated with responding to the request, a number of segments to be included in the second content;
   select a configuration from the plurality of segment configurations based at least in part on a determination that the configuration supports the number of segments, the configuration comprising at least one of: a duration of the segment, a sequence of slots in the segment, or a content duration usable in a slot of the segment, the slot usable to present a portion of the second content;
   generate a configuration file that includes the metadata and the configuration;
   determine the second content based at least in part on the configuration file; and
   send data about the first content and the second content to the device, the data causing the device to present the first content and the second content.

17. The system of claim 16, wherein the configuration comprises a first configuration of the segment and a second configuration of the slot, wherein the first configuration comprises a sequence of slots, and wherein the second configuration comprises a constraint on a type of content presentable in the slot.

18. The system of claim 16, wherein the device and the request are a first device and a first request, respectively, and wherein the execution of the computer-readable instructions further configures the system to:
   receive, from a second device and prior to the first request, first input indicating the configuration; and
   store, prior to receiving the first request, the configuration as part of the plurality of segment configurations.

19. The system of claim 16, wherein the execution of the computer-readable instructions further configures the system to:
   determine, based at least in part on a context associated with the request and the metadata, a number of cue points to use, wherein configuration is selected based at least in part on the number of cue points.

20. The system of claim 18, wherein the execution of the computer-readable instructions further configures the system to:
   receive, from a third device and prior to the first request, second input indicating at least one of: a number of advertisements to present or a constraint on a type of advertisement to present in the slot, wherein the configuration is selected based at least in part on a determination that the configuration supports the number of advertisements or the constraint.

* * * * *